UNITED STATES PATENT OFFICE.

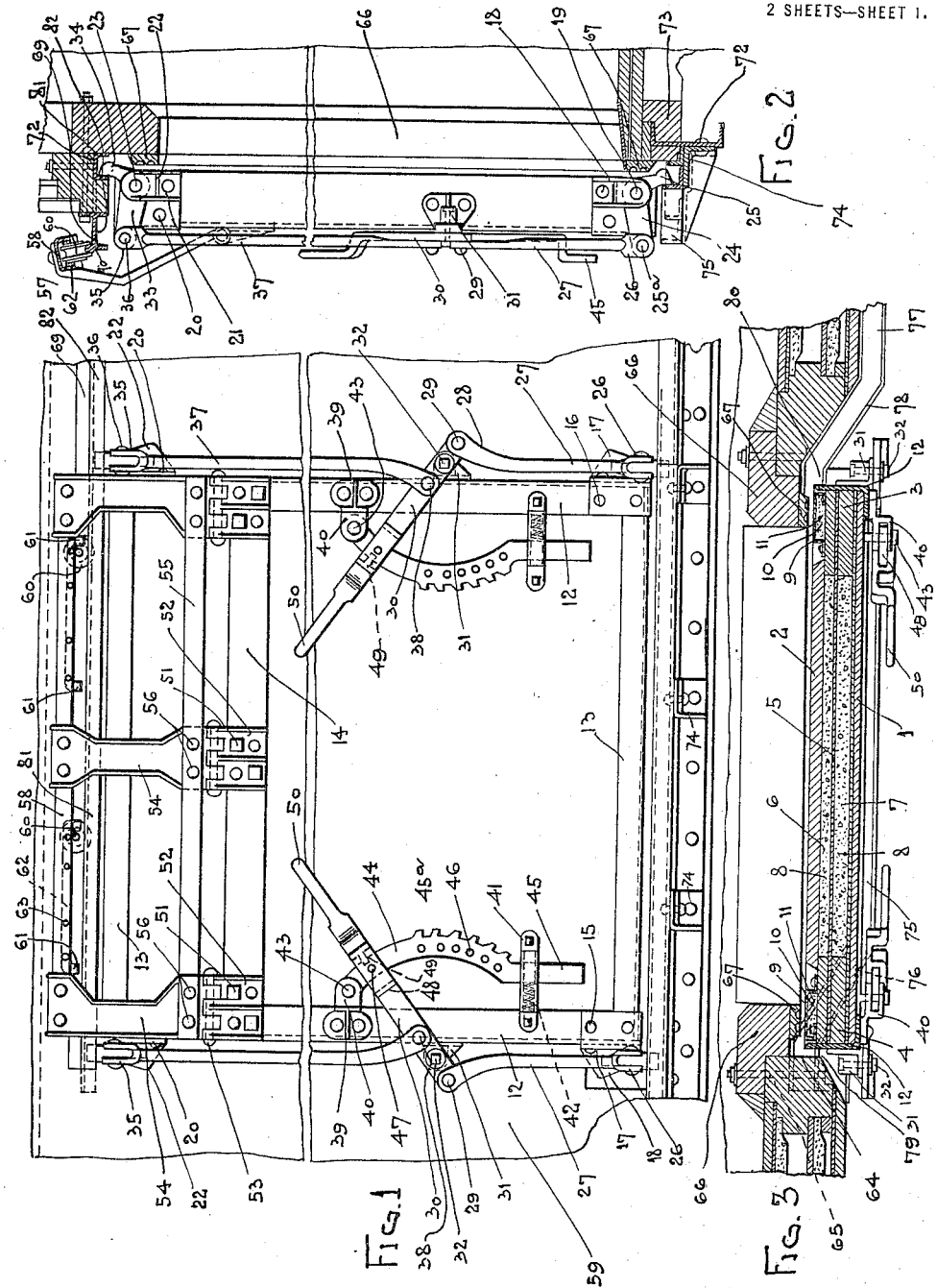

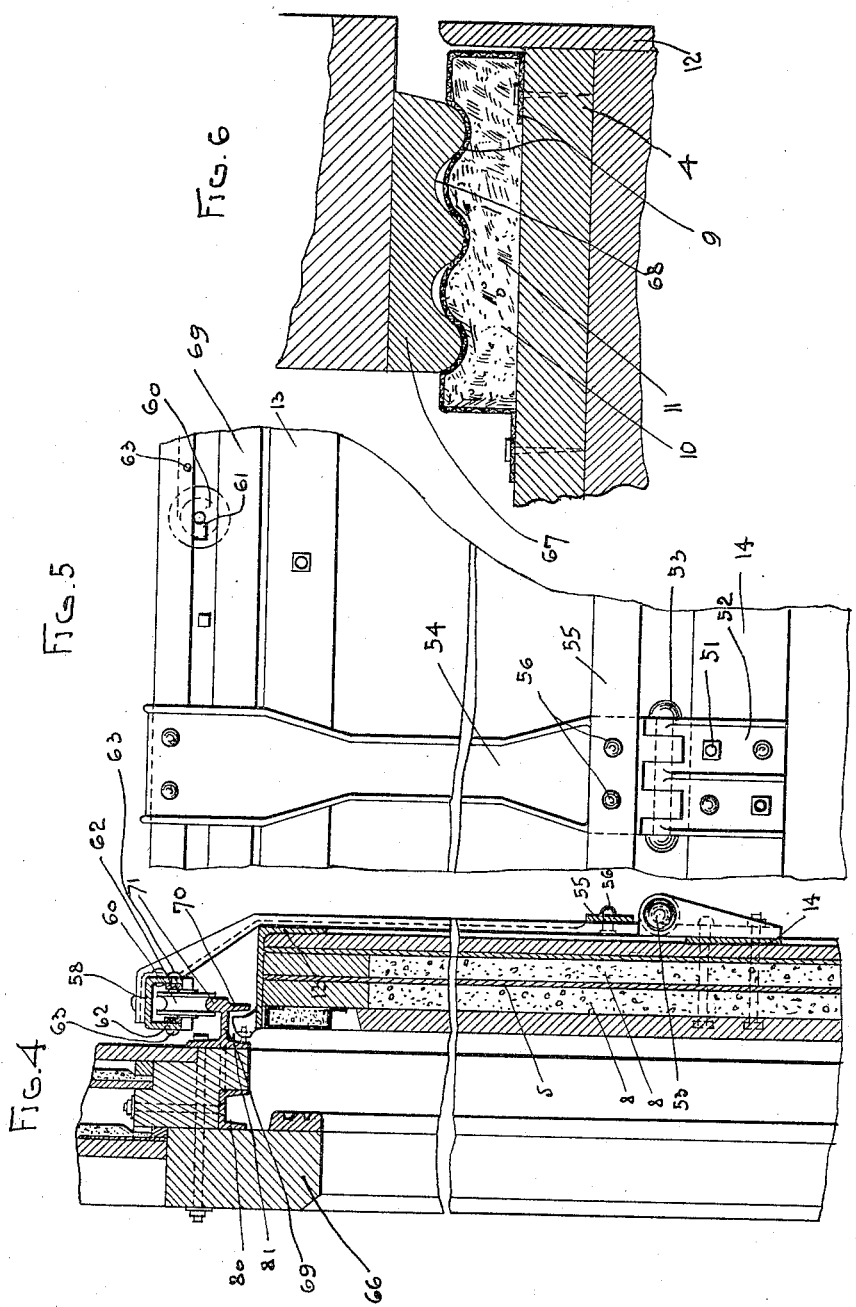

MARTIN THORSEN RELLING, OF BUTLER, PENNSYLVANIA.

CAR-DOOR.

1,179,864. Specification of Letters Patent. Patented Apr. 18, 1916.

Application filed June 8, 1915. Serial No. 32,967.

*To all whom it may concern:*

Be it known that I, MARTIN THORSEN RELLING, a subject of the King of Norway, residing at Butler, in the county of Butler and State of Pennsylvania, have invented certain new and useful Improvements in Car-Doors, of which the following is a specification.

This invention relates to car doors, more particularly doors for refrigerator cars and has for its object to provide a sliding car door, with hinged hangers and with means in a manner as hereinafter set forth for shifting the door into and out of the car door opening when desired.

A further object of the invention is to provide a sliding car door for refrigerator cars to overcome the objections at present in swinging doors now in general use, such objections being that the doors require a comparatively wide space for clearance in order that they may be thrown open, causing difficulties and danger, especially along warehouses and in railroad yards, and that the doors make an inefficient fit with the door frame, and the objections referred to are, overcome by providing a sliding door in accordance with this invention, as it can be shifted clear of the opening to provide convenient access to the car when loading or unloading without requiring any great free space alongside the car body.

A further object of the invention is to provide a sliding car door for refrigerator cars in a manner as hereinafter set forth with means for setting up a seal between the door and the door frame when the door is in position to close the car door opening.

Further objects of the invention are to provide a sliding car door which is simple in its construction and arrangement, strong, conveniently shifted to open and close position, readily set up with respect to the side of the car door opening and comparatively inexpensive.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—Figure 1 is a side elevation, broken away, of the side of the car further illustrated in elevation, broken away, of a sliding car door in accordance with this invention, the door being in position ready to be closed or clamped. Fig. 2 is a vertical sectional view of a sliding car door in accordance with this invention showing the adaptation thereof with respect to a door opening formed in the side of a car, the door being in position ready to be closed or clamped. Fig. 3 is a sectional plan with the door being in position ready to be closed or clamped. Fig. 4 is a sectional detail of the side of the car and the door. Fig. 5 is an enlarged detail elevation of the door. Fig. 6 is a sectional plan, illustrating the sealing means for the door.

Referring to the drawings in detail the door body comprises a front plate 1, a rear plate 2, two pairs of side members 3, 4, and the said pairs of members 3, 4, have interposed therebetween an intermediate plate 5. The pairs of members 3, 4, space the front plate 1 and rear plate 2 from the intermediate member 5 and by such an arrangement chambers 6, 7, are provided and in each of said chambers is a packing 8.

The rear plate 2 is of a width to extend over a portion of the inner members of the pairs of members 3, 4, and is secured thereto in any suitable manner.

Positioned against the inner face of the inner members of the pairs of members 3, 4, is a vertically disposed flexible element 9, which provides a pocket 10, in which is arranged a packing 11. The flexible elements 9 are secured to the inner members of the pairs of members 3, 4, in such a manner as to provide the pockets with closed sides, tops and bottoms.

The sides, top and bottom of the door body are reinforced respectively by angle irons 12, 13, and said door body is furthermore reinforced at its top with a transversely extending metallic member 14.

The lower corners of the car body has fixedly secured thereto, by the securing devices 15, 16, brackets 17, having the sides thereof formed with arms 18, carrying pivots 19. The lower portion of the arms 18 of each of the brackets, are cut away to provide clearances for a purpose to be presently referred to.

The upper corners of the car body have secured thereto by the securing devices 20, brackets 21, having arms 22 and said brackets 21 further have pivots 23. The upper portions of the arms 22 are cut away to provide clearances to be presently referred to. The arms 18 of the brackets 17 extend in opposite direction with respect to the arms 22 of the brackets 21.

Mounted upon the pivots 19 are bell cranks 24, one arm of each as at 25 is constructed to provide a hook and the other arm of the bell crank 24, is pivotally connected as at 25$^a$ to a yoke 26, carried on the lower end of the link 27 and said link 27 has the upper portion thereof curving outwardly as at 28 and pivotally connected as at 29, to the lower end of an operating lever 30. Secured to the sides of the door body are brackets 31, which carry pivots 32 for the levers 30.

Mounted upon the pivots 23 are bell cranks 33, which are oppositely disposed with respect to the bell cranks 24, and the inner arms of the bell cranks 33 are constructed to form a hook as at 34. The other arm of each of the bell cranks 33 extend in a yoke 35, and is pivotally connected therewith by the pin 36. The yoke 35 is carried by a link 37 having the lower portion thereof curving inwardly and pivotally connected to the lever 30 as at 38.

By the construction set forth relative to the levers 30 and links 27, 37, it is obvious that when the lever 30 is swung on its pivot, the links 27, 37, will be shifted causing the swinging of the bell cranks 24, 33, upon their pivots and the function of the bell cranks 24, 33 will be hereinafter referred to.

Secured to the angle irons 12, intermediate the upper and lower ends thereof, and above the brackets 31, are brackets 39, having arms 40, and secured to the car door body below the brackets 39 are keepers 41, having coil springs 42 arranged therein. Pivotally connected as at 43, to the arms 40, is the upper ends of curved racks 44, and each of said racks 44 has a straight lower portion 45 which extends down through a keeper 41 and bears against a coil spring 42. The function of the spring 42 is to force the lower portion of the racks 44 toward the inner ends of the keepers 41. The teeth of the racks 44 are indicated at 45$^a$ and the said racks 44 are furthermore provided with openings 46, each is adapted to register in the opening 47 formed in the lever 30 and by such an arrangement the flexible element of a seal can be extended through said registering openings and provides for the sealing of the car door.

Each of the levers 30 has its inner face formed with a transverse stop member 48 and is also formed on its inner face with a T-shape member 49 which is spaced from the stop member 48. Each of the levers 30 has a handle 50. The stem of the T-shape member 49 is adapted to engage the teeth 45$^a$ of the racks 44 to prevent shifting of said levers and owing to the arrangement of the springs 42, the racks will be maintained in engagement with the stem. Each of the racks 44, above the teeth 45$^a$, is provided with a notch 45$^b$ in which is adapted to engage the stem of a member 49 to arrest shifting movement of a lever 30.

The straight portions 45 of the racks 44, permit of the racks being shifted clear of the stem of the T-shape member and against the action of the spring 42, and under such conditions the levers 30 will be released and can be swung upwardly, and engage in the notches 45$^b$ whereby the levers 30 will remain stationary, keeping bell cranks in permanent position so as to act as guides when the door is shifted.

Secured to the stationary member 14, by the securing devices 51 are the stationary sections of a series of hinges 52 and pivotally connected to the sections 52, by the bolts 53, are the shifting sections 54 of said series of hinges, and the said sections 54, constitute hangers for the door and are connected together by a transversely extending bar 55, the latter being secured to said sections 54 by securing devices 56. The bolts 51 extend through the angle irons 12, door body and member 14 and connect these elements together.

The sections 54 extend above the top of the car door body and have their upper portions formed in an angular member as at 57. Secured to the angular portions of the sections 54, is an inverted channel shape member 58 which is of the same length as the width of the door body, and is disposed parallel with respect to the side 59 of a car. Arranged in and depending from the member 58 is a plurality of loose rollers 60. The shifting movement of each roller is arrested by the downturned ends 61 of a bar 62 disposed longitudinally of and within the member 59 and is secured thereto by the securing devices 63. A bar 62 associates with each roller 60.

The side of the car body has a door opening 64 and secured against the inner face of the side 59 by the securing devices 65 and extending within the door opening 64, is a door jamb 66, having each side, the top and the bottom thereof provided with a strip 67, of any suitable material having a corrugated outer face 68, The inner face of the door body at the top and bottom thereof has a continuation of the flexible member 9 so as to form a continuation of the pocket 10 and in which continuation is arranged the packing 11. Under such conditions the flexible element 9 extends not only against the inner face of the inner members of the pairs of members 3, 4, but also against the inner face of the pairs of members similar to and which form a continuation of the members 3, 4, and which are arranged at the top and bottom of the door body and between which extend the intermediate member 5 and the said continuation of the pairs of members 3, 4, are arranged between the front, intermediate, and rear plates 1, 2 and 5.

The function of the flexible element 9 and the packing is to set up a seal when the door is closed and said flexible element and packing associate with the corrugated strip 67 in a manner as illustrated in Fig. 6 and in this connection it will be stated that when the door is secured in position the strip 67 will compress the flexible element 9 and under such conditions set up a seal.

Secured to the side 59 of the car and above the car door opening 64 is a longitudinally extending I-beam 69, having the outer portion 70 set up to provide a track for the rollers 60. Said outer portion 70 is thickened as at 71 and extends in grooves of the rollers 60.

Secured to a longitudinal beam 72, the latter forming an element of the bottom 73 of the car and depending therebelow, is a bracket 74 which projects outward from the beam 73. The bracket 74 has fixedly secured thereto a channel-shape member 75 having one end thereof extending inwardly at an inclination as at 76 and said inclined portion 76 terminates at one side of the jamb 66.

Secured to the side 59 of the car is a channel-shape member 77, having one end thereof extending inwardly at an inclination as at 78 and which projects into the car door opening and terminates at the other side of the jamb 66. The inner terminus of the inclined portion 76, which is indicated at 79, extends in a direction parallel to the direction of the beam 73 and the inner terminus of the inclined portion 78, as indicated at 80, extends in a direction parallel to the direction of the beam 72. The members 75 provide a pocket for the arm 25 of one of the bell cranks 24 and the member 77 provides pockets for the arm 25 of the other bell crank 24.

Secured to the side 59 of the car at the top of the opening 64 is an inverted channel-shape member 81 of a construction similar to the member 75 and is arranged parallel with respect thereto and traveling in said member 81 is the arm 34 of a bell crank 33.

Secured to the car body 59 above the openings 64 is an inverted channel-shape member 82 of a construction similar to the member 77 and traveling in the member 82 is the arm 34 of the other bell crank 33.

The function of the bell cranks 24, 33, is to cause the door body to swing toward the jamb 66, when the arms 25, 34 of the said bell cranks are positioned in the inner termini of the inclined portions of the members 75, 77, 81 and 82 and such swinging of the door body toward the jamb 66 is caused by swinging the handle ends of the lever arms 40 downwardly causing the bell cranks 24, 33, to swing on their pivots and as the arms 25, 34, are engaging the inner termini of the members 75, 77, 81 and 82, as indicated in Fig. 2, it is obvious that the door will be swung toward the jamb and the strips 68 will compress the flexible member 9 thereby sealing the door and closing the door opening. When the door is sealed it is maintained in such position due to the arrangement of the racks 44 with the stems of the T-shape members 49 in a manner as before stated.

When the handle end of the member 30 is swung upwardly and engages in a notch 45$^b$ the clamping engagement between the arms 25, 34 of the bell cranks, with respect to the members 75 77 81 and 82, is overcome, the door can then be shifted in a direction of the length of the car, and the inclined portions of the members 75, 77, 81 and 82 will, as the door is being shifted, cause the door to swing outwardly and when the arms 25, 34, reach the outer termini of the said inclined portions the door body can then be shifted clear of the door opening.

As the sections 54 of the hinges, can swing on their pivots, it is obvious that the shifting movement of the door will not be retarded, in view of the fact that the rollers 60 can travel upon the track formed by the outer portion of the I-beam 69, or in other words the hinged hangers 54 overcome any binding action during the shifting movement of the door body when the latter is moved toward or away from the door opening in longitudinal direction and also permits of the door to be swung against the jamb when the levers 30 are moved downwardly to cause the clamping action between the arms 25, 34 and members 75, 77, 81 and 82.

What I claim is:—

1. In a sliding door the combination with the door body, and a hanger therefor, of upper and lower pairs of track members each having an inclined end portion, a track arranged upwardly and outwardly with respect to said upper pair of track members and upon which travels said hanger, shiftable bell cranks each having an arm traveling in a track member, and means for shifting said bell cranks to move said door body laterally to clamp it in position to close a door opening.

2. In a sliding door the combination with the door body, and a hanger therefor, of upper and lower pairs of track members each having an inclined end portion, a track arranged upwardly and outwardly with respect to said upper pair of track members and upon which travels said hanger, shiftable bell cranks each having an arm traveling in a track member, and means for shifting said bell cranks to move said door body laterally to clamp it in position to close a door opening, the track members of each pair of track members arranged in a longitudinal direction and with one member of each pair positioned in advance of the other member of said pair.

3. In a sliding door the combination with the door body, and a hanger therefor, of upper and lower pairs of track members each having an inclined end portion, a track arranged upwardly and outwardly with respect to said upper pair of track members and upon which travels said hanger, shiftable bell cranks each having an arm traveling in a track member, racks having spring pressed lower ends and their upper ends pivoted to the door body, levers engaging with said racks, and links having one end pivotally connected with said bell cranks and the other end pivotally connected with said levers for shifting the bell cranks when the levers are operated to move the door body laterally to open or close position.

4. In a sliding door the combination with the door body, and a hanger therefor, of upper and lower pairs of track members each having an inclined end portion, a track arranged upwardly and outwardly with respect to said upper pair of track members and upon which travels said hanger, shiftable bell cranks each having an arm traveling in a track member, racks having spring pressed lower ends and their upper ends pivoted to the door body, levers engaging with said racks, the links having one end pivotally connected with said bell cranks and the other end pivotally connected with said levers for shifting the bell cranks when the levers are operated to move the door body laterally to open or close position, the ends of said links pivoted to said levers being curved.

5. In a sliding door the combination with the door body, and a hanger therefor, of upper and lower pairs of track members each having an inclined end portion, a track arranged upwardly and outwardly with respect to said upper pair of track members and upon which travels said hanger, shiftable bell cranks each having an arm traveling in a track member, racks having spring pressed lower ends and their upper ends pivoted to the door body, levers engaging with said racks, and links having one end pivotally connected with said bell cranks and the other end pivotally connected with said levers for shifting the bell cranks when the levers are operated to move the door body laterally to open or close position, said levers projecting beyond the side edges of the door.

6. In a sliding door the combination with the door body, and a hanger therefor, of upper and lower pairs of track members each having an inclined end portion, a track arranged upwardly and outwardly with respect to said upper pair of track members and upon which travels said hanger, shiftable bell cranks each having an arm traveling in a track member, racks having spring pressed lower ends and their upper ends pivoted to the door body, levers engaging with said racks, and links having one end pivotally connected with said bell cranks and the other end pivotally connected with said levers for shifting the bell cranks when the levers are operated to move the door body laterally to open or close position, said levers projecting beyond the side edges of the door, and the ends of said links pivoted to said levers being curved.

7. In a sliding door the combination with the door body, and a hanger therefor, of upper and lower pairs of track members each having an inclined end portion, a track arranged upwardly and outwardly with respect to said upper pair of track members and upon which travels said hanger, shiftable bell cranks each having an arm traveling in a track member, racks having spring pressed lower ends and their upper ends pivoted to the door body, levers engaging with said racks, and links having one end pivotally connected with said bell cranks and the other end pivotally connected with said levers for shifting the bell cranks when the levers are operated to move the door body laterally to open or close position, said links being positioned beyond the side edges of said door.

8. In a sliding car door the combination with the door body, a track, and a hanger connected with the door and traveling upon said track, a bell crank pivotally supported from each side of the door body at the top and bottom thereof, an upper and a lower pair of track members arranged above and below the door body, each of said members having an inclined end portion, each of said bell cranks having one arm traveling in a track member, and means connected with the other arms of said bell cranks for operating these latter to shift the door laterally to open or close position.

9. In a sliding car door the combination with the door body, a track, and a hanger connected with the door and traveling upon said track, a bell crank pivotally supported from each side of the door body at the top and bottom thereof, an upper and a lower pair of track members arranged above and below the door body, each of said members having an inclined end portion, each of said bell cranks having one arm traveling in a track member, and means connected with the other arms of said bell cranks for operating these latter to shift the door laterally to open or close position, each of the track members of each pair arranged in a longitudinal direction and one in advance of the other.

10. In a sliding door the combination with the door body, and a hanger therefor, of upper and lower pairs of track members, each of said members of said pairs having an inclined end portion, the members of each pair arranged longitudinally and one in advance of the other, a track arranged above and outwardly with respect to said upper pair of track members and upon which travels said hangers, and means shiftable in said track members for moving said door body laterally to open or close a door opening.

In testimony whereof I affix my signature in presence of two witnesses.

MARTIN THORSEN RELLING.

Witnesses:
LUELLA H. SIMON,
H. LOHMEYER.